June 2, 1925.  1,540,086
G. F. PEASE
TRAILER BRAKE MECHANISM
Filed April 5, 1921
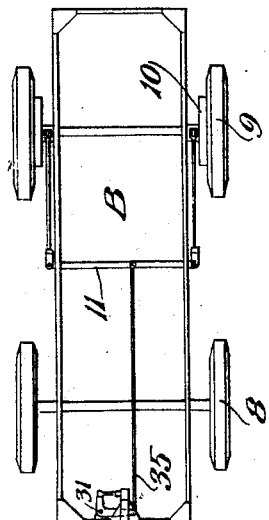
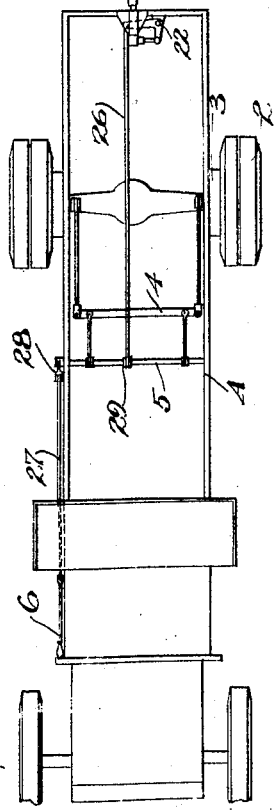
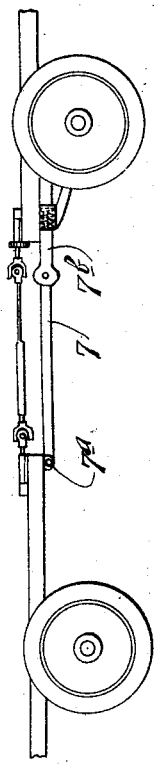
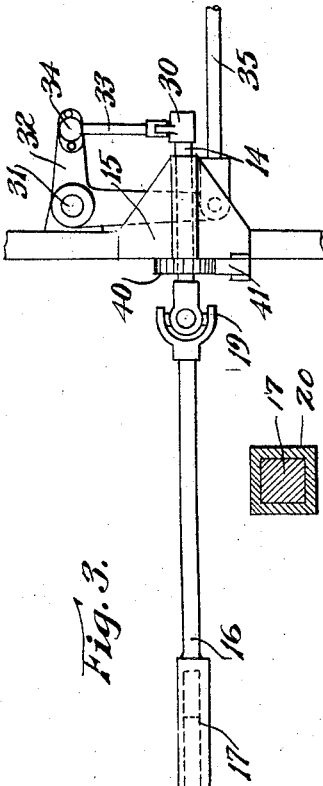
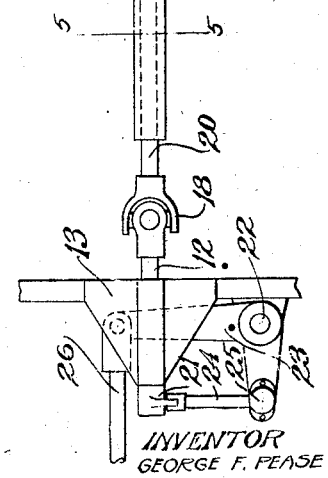
INVENTOR
GEORGE F. PEASE
By Chas E Townsend
ATTY Patented June 2, 1925.

1,540,086

UNITED STATES PATENT OFFICE.

GEORGE F. PEASE, OF SAN FRANCISCO, CALIFORNIA.

TRAILER-BRAKE MECHANISM.

Application filed April 5, 1921. Serial No. 458,864.

*To all whom it may concern:*

Be it known that I, GEORGE F. PEASE, a citizen of the United States, residing in the city and county of San Francisco and State of California, have invented new and useful Improvements in Trailer-Brake Mechanism, of which the following is a specification.

This invention relates to a vehicle brake and especially to a trailer brake mechanism adapted to be actuated from the truck or tractor to which the trailer is attached.

Where trailers are being used to a considerable extent, and particularly when hauls are being made through hilly country, it is obvious that an efficient and reliable braking mechanism is necessary, not only on the truck or tractor to which the trailers are attached, but also on the trailers proper. Great difficulty has been encountered in connection with trailer brakes, particularly when operated from the tractor or hauling unit as the brake mechanism has a tendency to be affected not only by the angular movement of the draw bar connecting the trailer and tractor, for instance, when making a turn, but the brake mechanism is also affected by the draw bar spring action.

One of the objects of the present invention is to generally improve and simplify the braking mechanism of a trailer, and especially to provide a brake actuating connection between the truck and the trailer which will not be affected by the angular movement of the draw bar connection, nor by the spring or yielding action of the same.

Another object of the invention is to provide a trailer brake which may be operated directly from the hauling unit, either independently or in unison with the braking mechanism of the same.

Further objects will hereinafter appear.

The invention consists of the parts and the construction, combination and arrangement of parts as hereinafter more fully described and claimed, having reference to the accompanying drawings, in which Fig. 1 is a plan view of a truck and trailer showing the application of the invention.

Fig. 2 is a partial side elevation of the truck and trailer showing the position of the draw bar and the trailer brake actuating mechanism.

Fig. 3 is an enlarged plan view of the telescoping connection formed between the truck and the trailer whereby the trailer brake is operated.

Fig. 4 is a detail end view of Fig. 3, showing the crank arm connection between the truck shaft and the link which connects the truck shaft with its bell crank lever.

Fig. 5 is a transverse sectional view on the line 5—5 of Fig. 3.

Referring to the drawings in detail, A indicates in general the main frame of a truck, 2 the rear driving wheels, 3 the brakes, 4 the equalizing bar, 5 the equalizing shaft, and 6 the emergency brake lever by which the brake mechanism in general is operated. Connected with the truck, in any suitable manner, or as here shown by a draw bar 7, is a trailer generally indicated at B. The trailer here shown is provided with front and rear wheels as at 8 and 9, and the rear wheels are provided with brakes 10 connected with an equalizing bar 11.

In practically all instances where a draw bar connection is employed, it is usual practice to permit elongation of the draw bar by spring action or the like, and also to permit angular movement of the draw bar, for instance, when making turns, etc. Where brakes are employed on the trailers, and particularly when the brakes are operated from the hauling unit, it invariably happens that the brake mechanism on the trailer is affected by the angular and resilient movement of the draw bar connection. The great difficulty heretofore encountered in designing a mechanical brake on a trailer has been to devise some mechanical means which will operate at all angles, and in addition thereto to provide a mechanical means having a flexible or extendible connection which will operate independently of the draw bar spring action formed between the truck and the trailer. The present invention has been designed to obviate these difficulties and is generally illustrated in Figs. 1, 2 and 3.

The mechanism consists of a short shaft section 12 journalled in a suitable bearing member 13 supported on the rear end of the main frame A of the truck. A similar shaft 14 is journalled on the front end of the main frame of the trailer as at 15. Both shafts 12 and 14 are connected with a shaft 16, having a telescoping connection such as shown at 17, the connection between the shafts and telescoping connections 16 and 17 being formed by interposing universal knuckles such as illustrated at 18 and 19. The telescoping connection may be designed in any suitable manner, but in this instance obtained by forming a square shaft section 20 and a similar square shaped tubular section 17. Secured on the inner end of the shaft section 12, which is supported by the rear end of the truck, is a crank arm 21, and pivotally mounted, as at 22, below the journal member 13, is a bell crank 23, one arm of which is connected by a link 24 with the crank arm 21; a universal connection being preferably formed, as at 25, to compensate for the radial swinging movement of the bell crank. Connected with the opposite end of the bell crank is a link or rod 26, and adapted to transmit a reciprocal movement to said rod is the equalizing shaft 5 and the emergency brake lever 6, that is the emergency brake lever 6 transmits a turning movement to the shaft 5 by means of a rod 27 and a crank arm 28, while shaft 5 in turn transmits a reciprocal movement to the rod 26 by means of a crank arm 29. Secured on the inner end of the shaft section 14, journalled in the bearing member secured on the front end of the trailer, is a crank arm 30, and pivotally supported below the journal member 15, as at 31, is a bell crank 32 which is connected with the crank arm 30 by means of a link 33, a universal connection being formed at 34 to compensate for the radial swinging movement of the bell crank. Connected with the opposite end of the bell crank is a rod 35, and connected with the opposite end of the rod is the equalizing bar 11 by which the brakes 10 of the trailer are actuated. The crank arm 30, the bell crank 32, and the universal connection 34, are in reality a duplicate arrangement of the mechanism supported by the truck and illustrated by the numerals 21, 22, 23, 24, and 25, the only difference being that their function is reverse to the mechanism supported by the truck.

In actual operation we will suppose that a trailer such as indicated at B is connected with the truck A by means of a draw bar 7, and that this draw bar is capable of elongation and angular movement as it is pivotally attached, as at 7ª, to the rear end of the truck and is resiliently connected to the trailer at the point indicated at 7ᵇ by spring means or the like. These particular connections are such as are employed in standard practice and are, practically speaking, necessary, first, because a draw bar having a resilient action is desirable to prevent transmission of shocks from one vehicle to another, and secondly, because pivotal and angular movement of the draw bar is necessary when making turns, etc. Using this particular form of connection, it is desirable to be able to actuate or operate the brakes 10 of the trailer independently of the draw bar connection. This is accomplished in the present instance by employing the mechanism as specifically illustrated in Fig. 3. Elongation of this connection is permitted by the telescoping sections 17 and 20, and angular movement is permitted when a curve or turn is being made as this is taken care of by the knuckle joints 18 and 19. Lost motion in either instance is obviated as the telescoping sections are square and no play is produced by the knuckle joints.

In actual operation if it is desired to set the brakes on the truck, and also on the trailer, it is only necessary to pull up on the brake lever 6, which is preferably arranged at a point where it may be conveniently grasped from the driver's seat. A pull on this lever transmits a turning movement to the shaft 5 through the medium of the rod 27 and the crank arm 28. This movement in turn is transmitted to set the brakes 3 on the truck as the equalizing bar 4 is directly connected with the shaft 5 by means of the links and crank arms shown. Movement is simultaneously transmitted through the rod 26 and crank arm 29 to rock the bell crank lever 23. This lever when rocked transmits a turning movement to the shaft section 12 through means of the crank arm 21 and the link 24. The turning movement transmitted to shaft 12 is in turn transmitted through the knuckle 18, the telescoping sections 20 and 17, shaft 16 and knuckle joint 19 to the shaft section 14. This turning movement of the shaft 14 is in turn transmitted through the crank arm 30 and link 33 to rock the bell crank 32 and as this rocks, it is obvious that it exerts a pull on the rod 35 and equalizing bar 11, which sets the brakes 10 on the trailer. From this it can be seen that a positive mechanical connection is formed between the truck and the trailer whereby the brakes can be set or released at any time desired; further that this brake actuating mechanism is in no way affected by the movement of the draw bar 7 as the connection shown in Fig. 3 is entirely free to operate regardless of the position assumed by the draw bar.

By referring to Fig. 3 it will be seen that the shaft 14 has keyed or otherwise secured thereto a ratchet wheel 40. This wheel is adapted to be engaged by a pawl 41, which may be thrown by hand into or out of engagement whenever desired. The pawl and ratchet wheel are provided for the purpose of locking the shaft 14 against turning movement when the brakes 10 on the trailer are set. For instance when the truck is released or the draw bar connection broken between the truck and the trailer, that is the telescoping connection consisting of the shaft sections 17 and 20 may be pulled apart when the trailer is released, and if the trailer is standing on sloping ground, and it is desired to set the brakes 10, it is only necessary to use the shaft sections 16 and 17 as a lever to turn the shaft 14 and then to lock said shaft when the brakes are set by dropping the pawl 41 into engagement with the ratchet wheel.

While the present mechanism is more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. The combination with the truck and the trailer, of a draw bar connecting the same, a shaft journalled on the truck, a shaft journalled on the trailer, a bell crank pivotally mounted on the trailer adjacent said shaft, a bell crank pivotally mounted on the truck adjacent its shaft, a crank arm on each shaft, a link connecting each crank arm with the adjacent bell crank, a telescoping shaft, a knuckle joint connecting each end of said shaft with the first named shafts, and means on the truck for imparting a rocking movement to the bell crank on the truck.

2. The combination with the truck and the trailer, of a draw bar connecting the same, a shaft journalled on the truck, a shaft journalled on the trailer, a bell crank pivotally mounted on the trailer adjacent said shaft, a bell crank pivotally mounted on the truck adjacent its shaft, a crank arm on each shaft, a link connecting each crank arm with the adjacent bell crank, a telescoping shaft, a knuckle joint connecting each end of said shaft with the first named shafts, means on the truck for imparting a rocking movement to the bell crank on the truck, a braking mechanism on the trailer, and means actuated by the bell crank on the trailer for setting or releasing the brake.

3. The combination with the truck and the trailer, of a draw bar connecting the same, a shaft journalled on the truck, a shaft journalled on the trailer, a bell crank pivotally mounted on the trailer adjacent said shaft, a bell crank pivotally mounted on the truck adjacent its shaft, a crank arm on each shaft, a link connecting each crank arm with the adjacent bell crank, a telescoping shaft, a knuckle joint connecting each end of said shaft with the first named shafts, means on the truck for imparting a rocking movement to the bell crank on the truck, a braking mechanism on the trailer, and means actuated by the bell crank on the trailer for setting or releasing the brake, said means comprising an equalizing bar, links connecting the equalizing bar with the brake mechanism, and a rod connecting the equalizing bar with the bell crank.

4. The combination with the trailer and the wheels supporting the same, of a brake mechanism on the wheels, a shaft journalled on the trailer, a crank arm on one end of the shaft, a bell crank pivotally mounted adjacent the shaft, a link connection between the crank arm and the bell crank, means actuated by the bell crank for setting or releasing the brakes, a truck, a draw bar connecting the truck with the trailer, and means on the truck for transmitting a turning movement to the shaft on the trailer.

5. The combination with the trailer and the wheels supporting the same, of a brake mechanism on the wheels, a shaft journalled on the trailer, a crank arm on one end of the shaft, a bell crank pivotally mounted adjacent the shaft, a link connection between the crank arm and the bell crank, means actuated by the bell crank for setting or releasing the brakes, a truck, a draw bar connecting the truck with the trailer, means on the truck for transmitting a turning movement to the shaft on the trailer, said means connecting the truck and the trailer, and means for locking the shaft on the trailer against rotation when the shaft turning connection between the truck and the trailer is disconnected.

6. The combination with the trailer and the wheels supporting the same, of a brake mechanism on the wheels, a shaft journalled on the trailer, a crank arm on one end of the shaft, a bell crank pivotally mounted adjacent the shaft, a link connection between the crank arm and the bell crank, means actuated by the bell crank for setting or releasing the brakes, a truck, a draw bar connecting the truck with the trailer, means on the truck for transmitting a turning movement to the shaft on the trailer, said means connecting the truck and the trailer, and means for locking the shaft on the trailer against rotation when the shaft turning connection between the truck and the trailer is disconnected, said means comprising a ratchet wheel secured on the shaft and a pawl engageable therewith.

7. The combination with the trailer and the wheels supporting the same, of a brake mechanism on the wheels, a shaft journaled on the trailer, a crank arm on one end of the shaft, a bell crank pivotally mounted adjacent the shaft, a link connection between the crank arm and the bell crank, means whereby upon rotation of said shaft, the bell crank is actuated for setting or releasing the brakes, a truck, and a draw bar detachably connecting the truck with the trailer.

8. The combination with the trailer and the wheels supporting the same, of a brake mechanism on the wheels, a shaft journaled on the trailer, a crank arm on one end of the shaft, a bell crank pivotally mounted adjacent the shaft, a link connection between the crank arm and the bell crank, means whereby upon rotation of said shaft, the bell crank is actuated for setting or releasing the brakes, a truck, and a draw bar detachably connecting the truck with the trailer, and a ratchet device having connection with said shaft to prevent reverse rotation of the shaft and thereby prevent accidental release of the trailer brake mechanism upon separation of the truck from the trailer.

GEORGE F. PEASE.